US012521879B2

(12) United States Patent
Beardsworth et al.

(10) Patent No.: US 12,521,879 B2
(45) Date of Patent: *Jan. 13, 2026

(54) ROBOT CONTROL PARAMETER INTERPOLATION

(71) Applicant: Intrinsic Innovation LLC, Mountain View, CA (US)

(72) Inventors: Michael Beardsworth, San Francisco, CA (US); Klas Jonas Alfred Kronander, Uppsala (SE); Sean Alexander Cassero, Ben Lomond, CA (US); Bala Venkata Sai Ravi Krishna Kolluri, Fremont, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 18/319,175

(22) Filed: May 17, 2023

(65) Prior Publication Data
US 2023/0286148 A1    Sep. 14, 2023

Related U.S. Application Data

(63) Continuation of application No. 16/885,035, filed on May 27, 2020, now Pat. No. 11,691,283.

(51) Int. Cl.
*B25J 9/16*    (2006.01)
*G05B 19/4103*    (2006.01)

(52) U.S. Cl.
CPC ............ *B25J 9/1653* (2013.01); *B25J 9/163* (2013.01); *B25J 9/1664* (2013.01)

(58) Field of Classification Search
CPC ........ B25J 9/1653; B25J 9/163; B25J 9/1664; B25J 9/1633; B25J 9/00; B25J 9/16;
(Continued)

(56) References Cited

U.S. PATENT DOCUMENTS 5,467,003 A * 11/1995 Kosaka ................. B25J 9/1684
                                                    318/572
5,590,244 A    12/1996 Nakata et al.
(Continued)

OTHER PUBLICATIONS

Ha et al., "KR-2009109652-A," Oct. 21, 2009 (Year: 2009).*

*Primary Examiner* — Adam R Mott
*Assistant Examiner* — Byron Xavier Kasper
(74) *Attorney, Agent, or Firm* — Fish & Richardson P.C.

(57) ABSTRACT

Methods, systems, and apparatus, including computer programs encoded on computer storage media, for computing interpolated robot control parameters. One of the methods includes receiving, by a real-time bridge from a control agent for a robot, a non-real-time command for the robot, wherein the non-real-time command specifies a trajectory to be attained by a component of the robot and a target value for a control parameter, wherein the control parameter controls how a real-time controller will cause the robot to react to one or more external stimuli encountered during a control cycle of the real-time controller. The real-time bridge provides the one or more real-time commands translated from the non-real-time command and interpolated control parameter information to the real-time controller, thereby causing the robot to effectuate the trajectory of the non-real-time command according to the interpolated control parameter information.

20 Claims, 4 Drawing Sheets

(58) Field of Classification Search
CPC ........ B25J 13/06; B25J 9/1656; B25J 9/1628;
B25J 9/1687; G05B 2219/34083; G05B
2219/39338; G05B 2219/41021; G05B
2219/42263; G05B 19/4103; G05B 19/41;
G05B 19/4148; G05D 19/409
See application file for complete search history.

(56) References Cited

U.S. PATENT DOCUMENTS

| | | |
|---|---|---|
| 9,149,931 B2 | 10/2015 | Kamiya |
| 9,382,643 B2 | 7/2016 | Moore et al. |
| 9,486,918 B1 | 11/2016 | Earl et al. |
| 10,668,623 B2 | 6/2020 | Zhang et al. |
| 11,300,963 B1* | 4/2022 | Webster ............... G05D 1/0214 |
| 2008/0058990 A1 | 3/2008 | Sassatelli et al. |
| 2009/0295324 A1* | 12/2009 | Shim ..................... B25J 9/1676 |
| | | 318/632 |
| 2013/0151009 A1 | 6/2013 | Okazaki et al. |
| 2016/0018816 A1 | 1/2016 | Hosek et al. |
| 2016/0214263 A1 | 7/2016 | Terada |
| 2018/0164793 A1* | 6/2018 | Takahashi ............ B23K 26/032 |
| 2018/0207798 A1* | 7/2018 | Tsuzaki ................. B25J 13/085 |
| 2018/0281185 A1* | 10/2018 | Toshimitsu ........... B25J 9/1697 |
| 2019/0061054 A1* | 2/2019 | Mizuno ................. B25J 9/1684 |
| 2019/0176325 A1 | 6/2019 | Liu et al. |
| 2019/0255712 A1 | 8/2019 | Takeuchi |
| 2020/0070346 A1 | 3/2020 | Oaki |
| 2020/0171657 A1 | 6/2020 | Baier et al. |

* cited by examiner

ROBOT CONTROL PARAMETER INTERPOLATION

CROSS-REFERENCE TO RELATED APPLICATIONS

This application is a continuation application of and claims the benefit of priority to U.S. application Ser. No. 16/885,035, filed on May 27, 2020, the contents of which are hereby incorporated by reference.

BACKGROUND

This specification relates to robotics, and more particularly to planning robotic movements.

Robotics control refers to scheduling the physical movements of robots in order to perform tasks. For example, an industrial robot that builds cars can be programmed to first pick up a car part and then weld the car part onto the frame of the car. Programming a robot to perform these actions can require planning and scheduling dozens or hundreds of individual movements by robot motors and actuators.

Robotics control has traditionally relied on real-time open-loop robot control, in which a real-time controller dictates what action or movement a robot should take during every period of a control cycle. Open-loop control allows the actions of a robot to be specified very precisely and before the real-time execution. In this specification, a real-time control system is a software system that is required to perform actions within strict timing requirements in order to achieve normal operation. The timing requirements often specify that certain processes must be executed or certain outputs must be generated within a particular time window in order for the system to avoid entering a fault state. In the fault state, the system can halt execution or take some other action that interrupts normal operation of a robot.

However, using open-loop control makes it difficult for robots to perform sophisticated actions in at least two ways. First, it is generally difficult to integrate sensor feedback, e.g., camera feedback, into open-loop control systems. This is because such sensors can only provide information at the time of execution, i.e., in a reactive and feedback manner, while open loop control assumes that all actions can be planned in advance. As an additional difficulty, the update rate of various sensors is different from the real-time control cycle, and many sensors are non-deterministic, meaning that the device is not guaranteed to generate an output every time that the output is required.

Secondly, the tight timing constraints of a real-time robot control system are usually incompatible with the compute time that is needed for more sophisticated robot control logic. For example, some reinforcement learning systems can use neural networks to generate actions for controlling a robot, but performing an inference pass through the trained network to compute each action typically takes far longer than the update cycle for a real-time robot.

SUMMARY

This specification describes how a system can use a real-time bridge to control a real-time robot with non-real-time control commands. As part of this process, the system can generate interpolated control parameters that allow the robot to alter how a real-time controller causes the robot to react to external stimuli in real time.

Particular embodiments of the subject matter described in this specification can be implemented so as to realize one or more of the following advantages. A real-time bridge allows a robot to incorporate both real-time and non-real-time sensor information even in a hard real-time system. Using interpolated control parameters provides additional capabilities for the robot to react in a more natural and fluid way, which results in higher precision movements, shorter cycle times, and more reliability when completing tasks. Thus, strict open-loop control is abandoned and a reactive feedback control system with potentially non-deterministic input from a non-realtime bridge is created.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
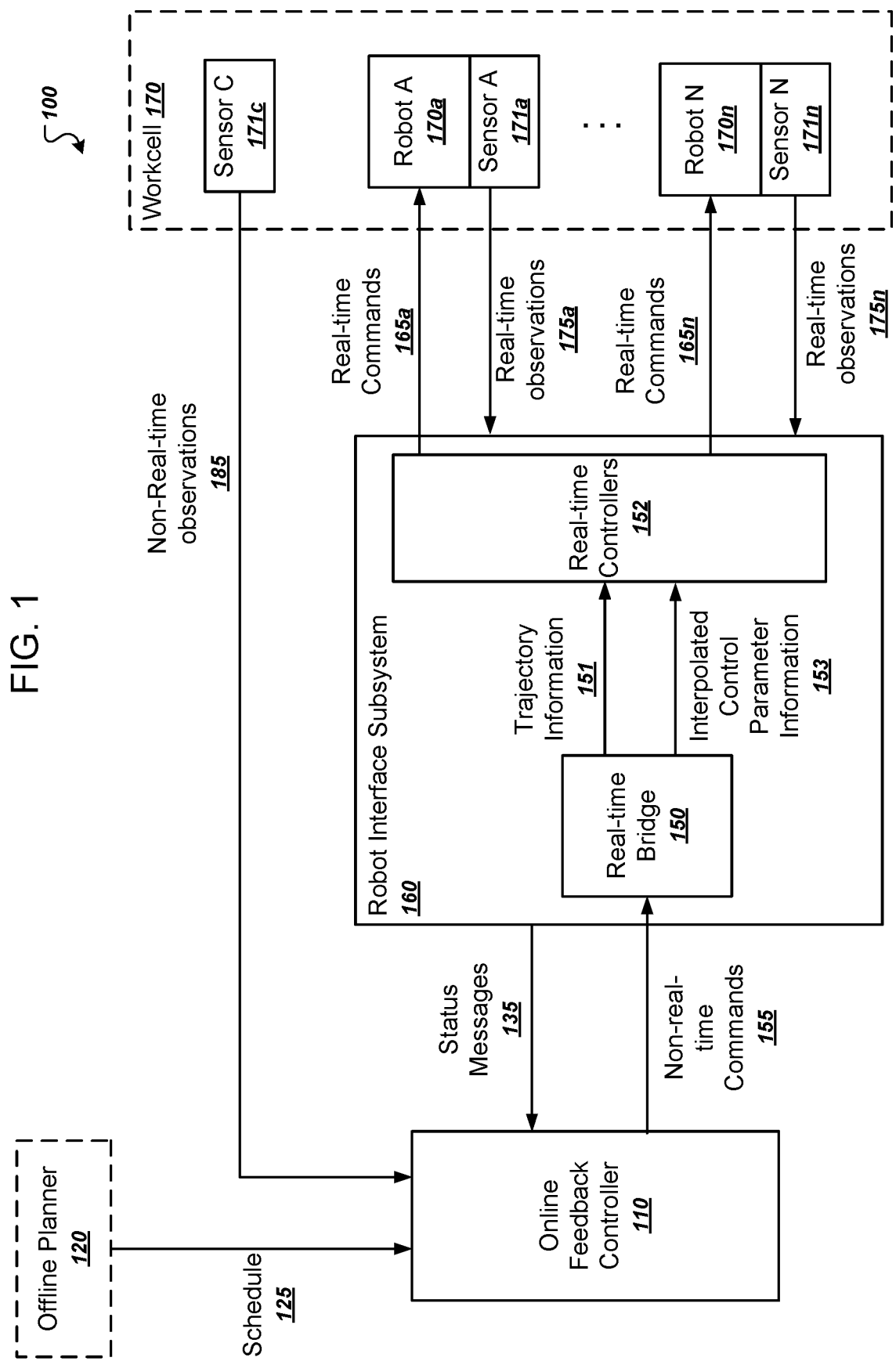
FIG. 1 is a diagram that illustrates an example system.

FIG. 1 is a diagram that illustrates an example system 100. The system 100 is an example of a system that can implement the online robotic control techniques described in this specification.

The system 100 includes a number of functional components, including an online feedback controller 110 and a robot interface subsystem 160. Each of these components can be implemented as computer programs installed on one or more computers in one or more locations that are coupled to each other through any appropriate communications network, e.g., an intranet or the Internet, or combination of networks.

In general, the online feedback controller 110 provides non-real-time commands 155 to be executed by the robot interface subsystem 160 as real-time commands 165*a*-*n* to drive one or more robots, e.g., robots 170*a*-*n*, in a workcell 170. In order to compute the non-real-time commands 155, the online feedback controller 110 can consume status messages 135 generated by the robot interface subsystem 160. The online feedback controller 110 can also optionally consume non-real-time observations 185 made by one or more sensors, e.g., the sensor 171*c*, that are making observations within the workcell 170. As illustrated in FIG. 1, each sensor 171 can be coupled to a respective robot 170. However, the sensors need not have a one-to-one correspondence with robots and need not be coupled to the robots. In fact, each robot can have multiple sensors, and the sensors can be mounted on stationary or movable surfaces in the workcell 170. For example, the sensor 171*c* is not coupled to a robot in the workcell 170.

The robot interface subsystem 160 and the online feedback controller 110 can operate according to different timing constraints. In some implementations, the robot interface subsystem 160 is a real-time software control system with hard real-time requirements. The online feedback controller

110, on the other hand, typically has more flexibility in operation. In other words, the online feedback controller 110 may, but need not, provide a command 155 within every real-time time window under which the robot interface subsystem 160 operates. However, in order to provide the ability to make sensor-based reactions, the online feedback controller 110 may still operate under strict timing requirements. In an example system, the real-time requirements of the robot interface subsystem 160 require that the robots provide a command at a first frequency, e.g., every 5, 10, or 20 milliseconds, while the online requirements of the online feedback controller 110 specify that the online feedback controller 110 should provide a command 155 to the robot interface subsystem 160 at a second frequency that is generally lower than the first frequency, e.g., every 25, 50, or 100 milliseconds. However, even if such a command is not received within the online time window, the robot interface subsystem 160 need not necessarily enter a fault state. Thus, in this specification, the term online refers to both the timing and rigidity parameters for operation. The time windows are larger than those for the real-time robot interface subsystem 160, and there is typically more flexibility when the timing constraints are not met. The specifics of timing constraints and the flexibility related to missed timing windows are generally configurable aspects of the system that can be tailored for the task being performed.

The system 100 can also optionally include an offline planner 120. The overall goal of the offline planner 120 is to generate, from a definition of one or more tasks to be performed, a schedule that will be executed by the robots 170*a-n* to accomplish the tasks. In this specification, a schedule is data that assigns each task to at least one robot. A schedule also specifies, for each robot, a sequence of actions to be performed by the robot. A schedule also includes dependency information, which specifies which actions must not commence until another action is finished. A schedule can specify start times for actions, end times for actions, or both. The offline planning process is typically computationally expensive. Thus, in some implementations, the offline planner 120 is implemented by a cloud-based computing system comprising many, possibly thousands, of computers. The offline planner 120 is thus commonly physically remote from a facility that houses the workcell 170. On the other hand, the online execute engine 110 is typically local to the facility that houses the workcell 170.

This arrangement thus provides three different computing zones. The offline planner 120 can use massive cloud-based computing resources to consider many possibilities for scheduling tasks, while also allowing for online reaction to unanticipated events by the online execution engine 110, while also providing the real-time precision and safety mechanisms of the robot interface subsystem 160.

Thus, in operation, the online feedback controller 110 issues non-real-time commands 165 to the robot interface system 160, which then issues real-time commands 165 in order to actually drive the movements of the moveable components, e.g., the joints, of the robots 170*a-n*. In some implementations, the robot interface subsystem 160 provides a hardware-agnostic interface so that the non-real-time commands 165 issued by online feedback controller 110 are compatible with multiple different versions and models of robots. During execution, the robot interface subsystem 160 can report status messages 135 back to the online feedback controller 110 so that the online feedback controller 110 can make online adjustments to the robot movements, e.g., due to local faults or other unanticipated conditions.

To bridge the boundary between the non-real-time commands 155 and the real-time commands 165, the robot interface subsystem 160 can use a real-time bridge 150. The real-time bridge is a module in the software stack that translates each non-real-time command into data that can be consumed by real-time controllers 152 that are responsible for generating low-level real-time commands 165. Such low-level real-time commands can, for example, relate to the actual levels of electrical current to be applied to robot motors and actuators at each point in time in order to effectuate the movements specified by the command.

In general, for a given non-real-time command, the real-time bridge 150 can generate trajectory information 151 for a robot component. The trajectory information 151 includes at least a trajectory set point for a robot component and optionally other metadata. In this setting, the trajectory is generated online by the real-time bridge 150, based on the commands 155 from the non-real-time online feedback controller 110. A trajectory set point can include for each moment in a particular time period, one or more of a position, a velocity, or an acceleration for the robot component. The trajectory generated by the real-time bridge 150 may be in Cartesian or joint space coordinates. The control function of the trajectory information 151 can be realized in a number of different ways, e.g., by the real-time bridge specifying parameters for a software function or process, or by a mapping between points in time and associated position, velocity, and acceleration values.

The trajectory information 151 can then be consumed by the real-time controllers 152, which use the trajectory information 151 to determine how to drive the motors and actuators of the robots 170 in order to follow the generated trajectory 151.

In order to support more advanced robotic actions, the real-time bridge 150 can generate interpolated control parameter information 153. In this specification, a control parameter is a value that specifies how a real-time controller will cause a robot component to move in order to follow the trajectory 151.

Real-time controllers generally have parameters that determine how the robots controlled by the controller are driven along the target trajectory. The behavior of the robotic system is hence determined not only by the trajectory information but also the control parameters. Different tasks may require or benefit from different control parameters, and those control parameters may also need to vary during the task for best performance. This specification describes techniques that provide the ability to command varying control parameters from the online feedback system 110, which are interpolated and regularized in accordance with task requirements by the real-time bridge 150.

The interpolated control parameters 153 are used by the real-time controllers 152 for driving the robot system along the trajectory 151. This is very unlike traditional robot control systems, where the control parameters are typically set once at manufacturing time or at setup of the robot installation and then never changed again.

The interpolated control parameter information can be implemented using a function that generates control parameter values at each point in time during a time period, or as a series of computed control parameter values. Notably, the interpolated control parameter information 153 can be used by the real-time controllers 152 to effectuate the real-time guarantees of the system, while not actually requiring real-time updates of the control parameters. In other words, the real-time bridge 150 can provide updates for the interpolated control parameter information 153 less frequently than is required to effectuate real-time control. For example, the real-time bridge might update the interpolated control parameter information once every 20 ms, while the real-time guarantees of the system require updating real-time commands 165$n$ every 5 ms.

One example of an interpolable control parameter is component stiffness. Component stiffness refers to how easily a component is moved by an external force. Component stiffness can refer to any appropriately movable component of a robot, e.g., a joint, in which case it may be referred to as joint stiffness. For example, if a human were to apply force to a robot arm in a particular direction, a joint stiffness control parameter can indicate how aggressively the real-time controllers 151 would work to counteract that force. With high joint stiffness, the real-time controllers 151 react faster and more aggressively in applying electric current in order to counteract an external force, resulting in a robot that appears to stiffly reject the external perturbation In contrast, with low joint stiffness, the real-time controllers 151 might react more slowly and less aggressively in order to counteract an external force, resulting in a robot behavior that appears to give in to the applied perturbation.

In this specification, an interpolable control parameter is a control parameter that is separate from trajectory parameters such as position, velocity, acceleration, or joint angle, and that has a defined range of possible values that the robot can assume. What is considered an interpolable control parameter may depend on the capabilities of the underlying robot model. For example, some robot models may provide the functionality for a control system to specify a joint torque value. In such a system, a joint stiffness controller can be implemented as an instance of 152, which would use joint trajectory information and joint stiffness information to compute a torque value to be applied in each joint. In some other implementations, the control parameters are implemented by one or more layers of the real-time software control stack affecting how the joints react to certain external stimuli.

Another example of an interpolable control parameter is damping level. The damping level for a robot arm refers to how aggressively the robot control system will actively counteract oscillations. High damping levels can be useful when oscillations need to be aggressively counteracted, for example, when the robot needs to maintain a position when a tool on the robot arm, a drill or a jackhammer, generates a lot of strong oscillations. Low damping levels, on the other hand, can be useful when the robot needs to perform fast reactive control. Damping is an example of an interpolable control parameter because the system can compute an interpolated value between any arbitrary damping values that will control how the robot reacts to external forces.

Another example of an interpolable control parameter is feedback gain. Feedback gain for a robot arm refers to how aggressively a robot control system will attempt to make corrections to deviations from reference positions. For example, a robot can be equipped with sensors that allow the robot to determine a joint position with high precision. During normal operation, forces such as gravity or the weight of objects being picked up can cause a robot arm to deviate from a desired reference position. High feedback gain means that the robot control system will quickly seek to remedy any deviations from reference positions, e.g., by aggressively ramping up electrical motor current, while low feedback gain means that the robot control system will more slowly seek to remedy any deviations from reference positions, e.g., by more slowly ramping up electrical motor current.

The real-time controllers 152 receive the trajectory information 151 and the interpolated control parameters 153 and use this information to control the robots 170$a$-$n$. In some implementations, the interpolated control parameters 153 are represented as a function that can be used to compute a control parameter value at each of multiple points in a time period.

In operation, the real-time controllers 152 will often be using interpolated control parameter information 153 at the boundary between two tasks of a schedule that need to be performed with different control parameter values.

For example, a schedule can specify a connector insertion action that requires the robot to perform three tasks in sequence: pick up a connector plug, move to a particular location, and insert the connector plug into a jack. One of the most important factors for a robot installation is often cycle time, which refers to how quickly a robot can perform the tasks on the schedule. But another is reliability. In this example, joint stiffness in particular can have conflicting requirements for the movement task and the insertion task. Having a high joint stiffness can allow the robot to move very quickly and precisely within the workcell without the robot arm being negatively affected by inertia or gravity. However, a high joint stiffness when inserting the connector plug into the jack makes it more likely that the connector plug or the jack will be damaged if they are misaligned. Therefore, the connector insertion task having low joint stiffness can increase the reliability of the robot.

Thus, at the boundary between the movement task and the connector insertion task, the real-time controllers 152 can use interpolated control parameter information. Doing so thus provides the robot with a new capability to perform smooth transitions between the tasks, which tends to make operation of the robot more precise, faster, more reliable, and more robust to failures.

Figure 2:
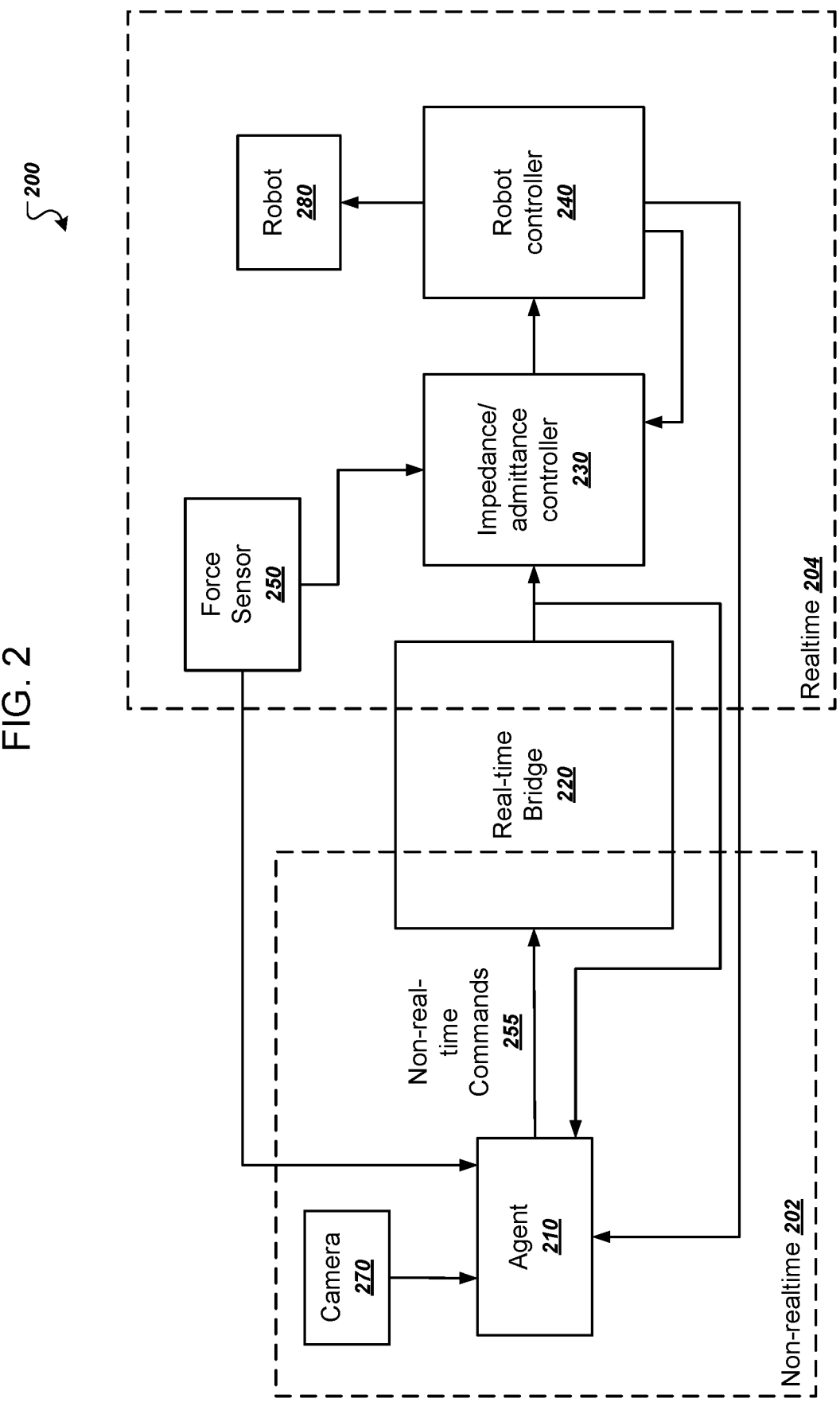
FIG. 2 is a diagram of an example system that uses a real-time bridge to compute interpolated control parameters from non-real-time commands.

FIG. 2 is a diagram of an example system 200 that uses a real-time bridge 260 to compute interpolated control parameters from non-real-time commands 255. The system 200 is one example of a system that can use non-real-time sensor inputs to control a real-time system. In this example the system 200 includes a camera 270, which is an example of a non-real-time sensor. The camera 270 can be a non-real-time sensor, for example, if the camera 270 does not have a capture rate that satisfies the real-time update criteria or if the camera 270 does not have a capture rate that is sufficiently deterministic. In contrast, the system 200 also includes a real-time force sensor 250, which can be an example of a real-time sensor that has a sufficiently fast capture rate and that is sufficiently deterministic.

The system 200 thus operates with components in two zones, a non-real-time zone 202 and a real-time zone 204. As illustrated, the real-time bridge 220 spans both of these zones.

In operation, an agent 210 receives input from the camera 270, the force sensor 250, and the real-time robot controller 240. The agent 210 can be any appropriate software planning module for generating robot motions in response to online detections.

The agent 210 can then generate non-real-time commands 255 that are computed to react to the stimuli represented in the sensor data captured by the camera 270 and the force sensor 250.

The real-time bridge 220 receives the non-real-time commands 255 and generates both real-time trajectory information and real-time interpolated control parameter information to be used by the impedance/admittance controller 230. As described above, the trajectory and control parameter information can allow the impedance/admittance controller 230 to perform multiple updates to the control parameter values over multiple real-time control cycles before receiving another command from the real-time bridge 220. As illustrated, the impedance/admittance controller 230 also receives real-time input from the force sensor 250.

The impedance/admittance controller then uses its inputs to compute real-time commands to be consumed by to the low-level robot controller 240 in order to drive a robot 280. For example, if the impedance/admittance controller controls joint torque, it uses the trajectory information and interpolated impedance parameters (e.g. stiffness, damping) to compute a joint torque vector in realtime. In this arrangement, the Agent 210 can influence not only the nominal motion of the robot (which is done via trajectory information), but also how the robot responds to external forces during the motion. In particular, the real-time bridge 220 allows this behavior to vary during the task, by safely interpolating the non-real-time commands 255 (trajectory information and control parameter information).

In addition, this example illustrates how the impedance/admittance controller 230 can issue real-time commands using both real-time and non-real-time sensors, e.g., the real-time force sensor 250 and the non-real-time camera 270, as well as real-time interpolated control parameter information. In other words, the real-time impedance/admittance controller 230 can effectuate the desired real-time behavior because it has real-time control parameter information that allows it to adjust the robot's behavior at every period of the control cycle.

Figure 3:
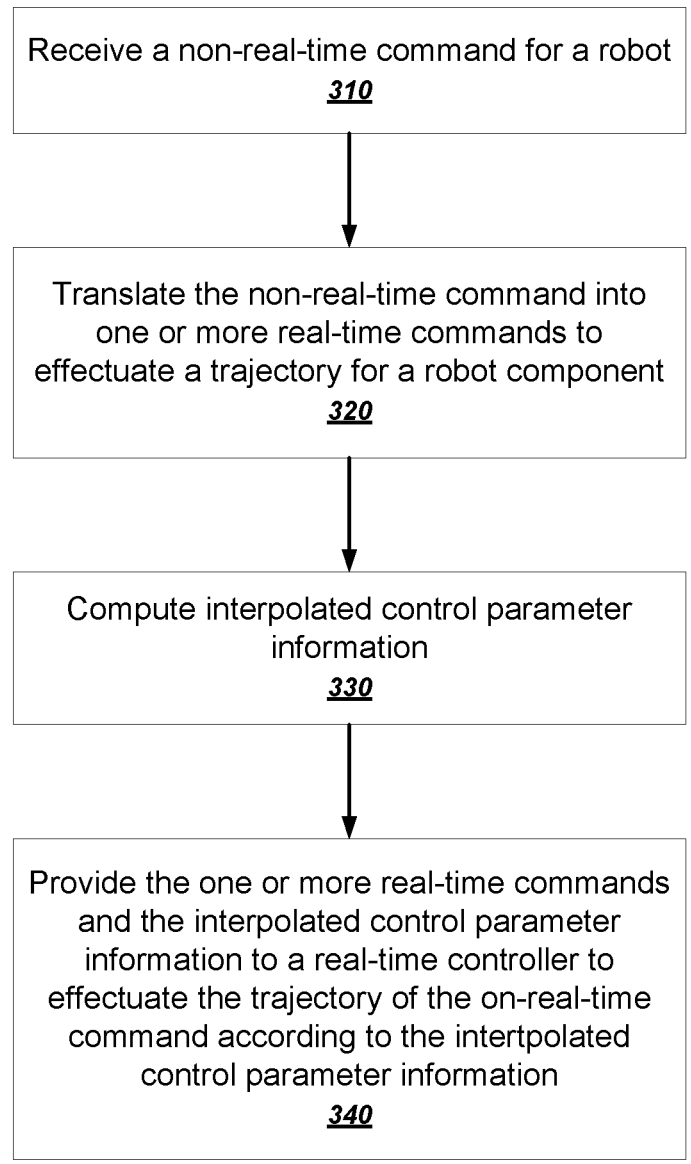
FIG. 3 is a flowchart of an example process for computing interpolated control parameters.

FIG. 3 is a flowchart of an example process for computing interpolated control parameters. The example process can be performed by a system of one or more computers appropriately programmed in accordance with this specification. For example, the example process can be performed by a real-time bridge, e.g., the real-time bridge 150 of FIG. 1. For convenience, the example process will be described as being performed by a system of one or more computers.

The system receives a non-real-time command for a robot (310). As described above, the non-real-time command can specify a trajectory point to be attained by a component of the robot as well as a target value for a control parameters, which may among other things influence how the robot will react to external perturbations.

The system translates the non-real-time command into one or more real-time commands to effectuate a trajectory for a robot component (320).

The system computes interpolated control parameter information (330). As described above, the system can compute an interpolated value for the control parameter at each of multiple points in a time period, which can correspond to different real-time control cycles of the robot.

To compute the interpolated control parameter information, the system can use a start and an end control parameter values. For example, the system can use a previously set control parameter value, which can also correspond to the currently used control parameter value, as the start value. The system can use a target control parameter value of the non-real-time command as the end control parameter value. The system can then use any appropriate interpolation technique to compute interpolated control parameter information that assigns a value to the control parameter at each of multiple points in the time period. The interpolation technique can include limitations of the values of the control parameters, and the rate of change as well as higher order time-derivatives thereof. Imposing such limits can be important both from a stability perspective (careless variation in control parameters can lead to an unstable system) and from a performance perspective (there is often prior knowledge about a controller or process that precludes aggressive variation of control parameters.) For example, the system can use any appropriate curve fitting procedure or other mathematical interpolation method, e.g., linear interpolation with limited rate of change, to compute the interpolated control parameter information.

The system provides the one or more real-time commands and the interpolated control parameter information to a real-time controller of the robot to effectuate the trajectory of the non-real-time command according to the interpolated control parameter information (340). In other words, the real-time controller will use the different values for the control parameter at each point in time in order to compute how the robot components will effectuate the trajectory of the non-real-time command.

Figure 4:
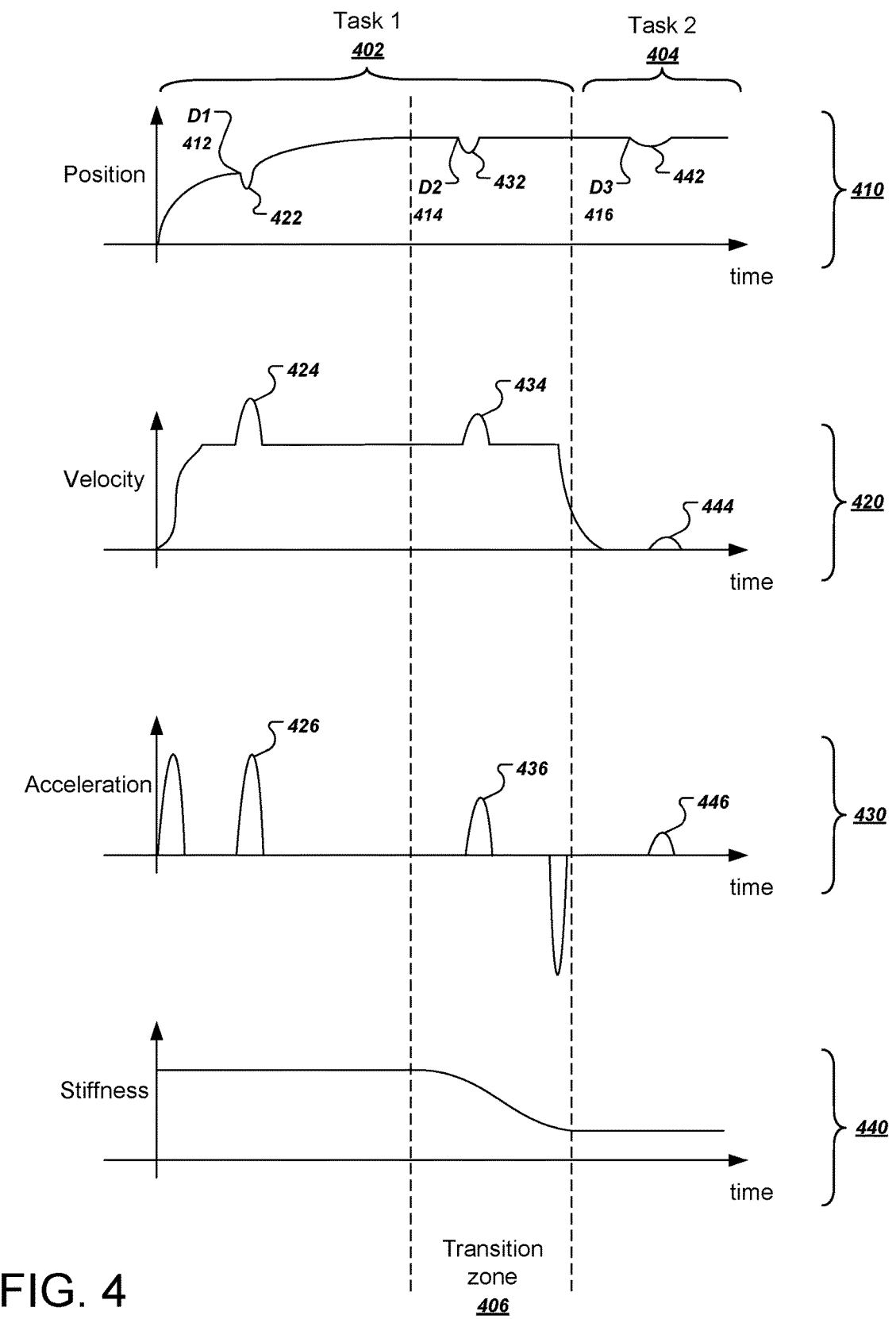
FIG. 4 is a diagram illustrating trajectory and interpolated control parameter information over time for a schedule having two tasks.

FIG. 4 is a diagram illustrating trajectory and interpolated control parameter information over time for a schedule having two tasks. In this example, task 1 402 is performed before task 2 404. This example assumes that task 1 requires a higher stiffness control parameter than task 2. Thus, for example, task 1 might be a fast movement task, and task 2 might be a connector insertion task.

The example in FIG. 4 illustrates how the robot can use interpolated control parameter information to respond differently to different disturbances encountered while performing tasks 1 and 2. In particular, D1 412 occurs when the robot is performing task 1, D3 416 occurs when the robot is performing task 2, and D2 414 occurs in a transition zone 406

Plots 410, 420, and 430 represents a robot component's position, velocity, and acceleration, respectively over the time required to perform tasks 1 and 2. This information can be represented explicitly in real-time commands computed for a particular trajectory or this information can be derived from such real-time commands.

Plot 440 illustrates control parameter information over time. Plot 440 illustrates a transition zone 406 having interpolated control parameters. FIG. 4 illustrates the transition zone 406 as being part of task 1, however, the transition zone could alternatively or in addition belong to both tasks or neither task.

When D1 412 occurs during task 1, the robot has a high stiffness control parameter. Thus, the robot reacts aggressively, resulting in a sharp position, velocity, and acceleration curves 422, 424, and 426. This can for example be when the robot is quickly transitioning to a connection insertion point.

When D3 416 occurs during task 2, the robot has a low stiffness control parameter. Thus, the robot reacts less aggressively, resulting in blunt position, velocity, and acceleration curves 442, 444, and 446.

When D2 414 occurs in the transition zone 406, the robot is using interpolated control parameters. This results in mid-range position, velocity, and acceleration curves 432, 434, and 436 that are between those curves that resulted from high stiffness and low stiffness. For example, the acceleration curve 436 resulting from the interpolated control parameters is somewhere between the acceleration curves 426 and 446 resulting from high and low stiffness respectively. Similarly, the velocity curve 434 resulting from the interpolated control parameter is somewhere between the velocity curves 424 and 444 resulting from high and low stiffness respectively.

As described above, during the transition zone 406 the robot can use the interpolated control parameters to change the value of a control parameter in real-time. This is very unlike traditional uses of control parameters that are set only once during initial setup and then never changed again.

In this specification, a robot is a machine having a base position, one or more movable components, and a kinematic model that can be used to map desired positions, poses, or both in one coordinate system, e.g., Cartesian coordinates, into commands for physically moving the one or more movable components to the desired positions or poses. In this specification, a tool is a device that is part of and is attached at the end of the kinematic chain of the one or more moveable components of the robot. Example tools include grippers, welding devices, and sanding devices.

In this specification, a task is an operation to be performed by a tool. For brevity, when a robot has only one tool, a task can be described as an operation to be performed by the robot as a whole. Example tasks include welding, glue dispensing, part positioning, and surfacing sanding, to name just a few examples. Tasks are generally associated with a type that indicates the tool required to perform the task, as well as a position within a workcell at which the task will be performed.

In this specification, a motion plan is a data structure that provides information for executing an action, which can be a task, a cluster of tasks, or a transition. Motion plans can be fully constrained, meaning that all values for all controllable degrees of freedom for the robot are represented explicitly or implicitly; or underconstrained, meaning that some values for controllable degrees of freedom are unspecified. In some implementations, in order to actually perform an action corresponding to a motion plan, the motion plan must be fully constrained to include all necessary values for all controllable degrees of freedom for the robot. Thus, at some points in the planning processes described in this specification, some motion plans may be underconstrained, but by the time the motion plan is actually executed on a robot, the motion plan can be fully constrained. In some implementations, motion plans represent edges in a task graph between two configuration states for a single robot. Thus, generally there is one task graph per robot.

In this specification, a motion swept volume is a region of the space that is occupied by a least a portion of a robot or tool during the entire execution of a motion plan. The motion swept volume can be generated by collision geometry associated with the robot-tool system.

In this specification, a transition is a motion plan that describes a movement to be performed between a start point and an end point. The start point and end point can be represented by poses, locations in a coordinate system, or tasks to be performed. Transitions can be underconstrained by lacking one or more values of one or more respective controllable degrees of freedom (DOF) for a robot. Some transitions represent free motions. In this specification, a free motion is a transition in which none of the degrees of freedom are constrained. For example, a robot motion that simply moves from pose A to pose B without any restriction on how to move between these two poses is a free motion. During the planning process, the DOF variables for a free motion are eventually assigned values, and path planners can use any appropriate values for the motion that do not conflict with the physical constraints of the workcell.

The robot functionalities described in this specification can be implemented by a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the onsite execution engine 150 and the robot interface subsystem 160 of FIG. 1.

The software stack can include multiple levels of increasing hardware specificity in one direction and increasing software abstraction in the other direction. At the lowest level of the software stack are robot components that include devices that carry out low-level actions and sensors that report low-level statuses. For example, robots can include a variety of low-level components including motors, encoders, cameras, drivers, grippers, application-specific sensors, linear or rotary position sensors, and other peripheral devices. As one example, a motor can receive a command indicating an amount of torque that should be applied. In response to receiving the command, the motor can report a current position of a joint of the robot, e.g., using an encoder, to a higher level of the software stack.

Each next highest level in the software stack can implement an interface that supports multiple different underlying implementations. In general, each interface between levels provides status messages from the lower level to the upper level and provides commands from the upper level to the lower level.

Typically, the commands and status messages are generated cyclically during each control cycle, e.g., one status message and one command per control cycle. Lower levels of the software stack generally have tighter real-time requirements than higher levels of the software stack. At the lowest levels of the software stack, for example, the control cycle can have actual real-time requirements. In this specification, real-time means that a command received at one level of the software stack must be executed and optionally, that a status message be provided back to an upper level of the software stack, within a particular control cycle time. If this real-time requirement is not met, the robot can be configured to enter a fault state, e.g., by freezing all operation.

At a next-highest level, the software stack can include software abstractions of particular components, which will be referred to motor feedback controllers. A motor feedback controller can be a software abstraction of any appropriate lower-level components and not just a literal motor. A motor feedback controller thus receives state through an interface into a lower-level hardware component and sends commands back down through the interface to the lower-level hardware component based on upper-level commands received from higher levels in the stack. A motor feedback controller can have any appropriate control rules that determine how the upper-level commands should be interpreted and transformed into lower-level commands. For example, a motor feedback controller can use anything from simple logical rules to more advanced machine learning techniques to transform upper-level commands into lower-level commands. Similarly, a motor feedback controller can use any appropriate fault rules to determine when a fault state has been reached. For example, if the motor feedback controller receives an upper-level command but does not receive a lower-level status within a particular portion of the control cycle, the motor feedback controller can cause the robot to enter a fault state that ceases all operations.

At a next-highest level, the software stack can include actuator feedback controllers. An actuator feedback controller can include control logic for controlling multiple robot components through their respective motor feedback controllers. For example, some robot components, e.g., a joint arm, can actually be controlled by multiple motors. Thus, the actuator feedback controller can provide a software abstraction of the joint arm by using its control logic to send commands to the motor feedback controllers of the multiple motors.

At a next-highest level, the software stack can include joint feedback controllers. A joint feedback controller can represent a joint that maps to a logical degree of freedom in a robot. Thus, for example, while a wrist of a robot might be controlled by a complicated network of actuators, a joint feedback controller can abstract away that complexity and exposes that degree of freedom as a single joint. Thus, each joint feedback controller can control an arbitrarily complex network of actuator feedback controllers. As an example, a six degree-of-freedom robot can be controlled by six different joint feedback controllers that each control a separate network of actual feedback controllers.

Each level of the software stack can also perform enforcement of level-specific constraints. For example, if a particular torque value received by an actuator feedback controller is outside of an acceptable range, the actuator feedback controller can either modify it to be within range or enter a fault state.

To drive the input to the joint feedback controllers, the software stack can use a command vector that includes command parameters for each component in the lower levels, e.g. a positive, torque, and velocity, for each motor in the system. To expose status from the joint feedback controllers, the software stack can use a status vector that includes status information for each component in the lower levels, e.g., a position, velocity, and torque for each motor in the system. In some implementations, the command vectors also include some limit information regarding constraints to be enforced by the controllers in the lower levels.

At a next-highest level, the software stack can include joint collection controllers. A joint collection controller can handle issuing of command and status vectors that are exposed as a set of part abstractions. Each part can include a kinematic model, e.g., for performing inverse kinematic calculations, limit information, as well as a joint status vector and a joint command vector. For example, a single joint collection controller can be used to apply different sets of policies to different subsystems in the lower levels. The joint collection controller can effectively decouple the relationship between how the motors are physically represented and how control policies are associated with those parts. Thus, for example if a robot arm has a movable base, a joint collection controller can be used to enforce a set of limit policies on how the arm moves and to enforce a different set of limit policies on how the movable base can move.

At a next-highest level, the software stack can include joint selection controllers. A joint selection controller can be responsible for dynamically selecting between commands being issued from different sources. In other words, a joint selection controller can receive multiple commands during a control cycle and select one of the multiple commands to be executed during the control cycle. The ability to dynamically select from multiple commands during a real-time control cycle allows greatly increased flexibility in control over conventional robot control systems.

At a next-highest level, the software stack can include joint position controllers. A joint position controller can receive goal parameters and dynamically compute commands required to achieve the goal parameters. For example, a joint position controller can receive a position goal and can compute a set point for achieve the goal.

At a next-highest level, the software stack can include Cartesian position controllers and Cartesian selection controllers. A Cartesian position controller can receive as input goals in Cartesian space and use inverse kinematics solvers to compute an output in joint position space. The Cartesian selection controller can then enforce limit policies on the results computed by the Cartesian position controllers before passing the computed results in joint position space to a joint position controller in the next lowest level of the stack. For example, a Cartesian position controller can be given three separate goal states in Cartesian coordinates x, y, and z. For some degrees, the goal state could be a position, while for other degrees, the goal state could be a desired velocity.

These functionalities afforded by the software stack thus provide wide flexibility for control directives to be easily expressed as goal states in a way that meshes naturally with the higher-level planning techniques described above. In other words, when the planning process uses a process definition graph to generate concrete actions to be taken, the actions need not be specified in low-level commands for individual robotic components. Rather, they can be expressed as high-level goals that are accepted by the software stack that get translated through the various levels until finally becoming low-level commands. Moreover, the actions generated through the planning process can be specified in Cartesian space in way that makes them understandable for human operators, which makes debugging and analyzing the schedules easier, faster, and more intuitive. In addition, the actions generated through the planning process need not be tightly coupled to any particular robot model or low-level command format. Instead, the same actions generated during the planning process can actually be executed by different robot models so long as they support the same degrees of freedom and the appropriate control levels have been implemented in the software stack.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising
receiving, by a real-time bridge from a control agent for a robot, a non-real-time command for the robot, wherein the non-real-time command specifies a trajectory to be attained by a component of the robot and a target value for a control parameter, wherein the control parameter controls how a real-time controller will cause the robot to react to one or more external stimuli encountered during a control cycle of the real-time controller;
translating, by the real-time bridge, the non-real-time command into one or more real-time commands to be processed by a real-time robot controller, including computing a trajectory for a robot component and computing interpolated control parameter information from the target value for the control parameter; and
providing, by the real-time bridge, the one or more real-time commands and the interpolated control parameter information to the real-time controller, thereby causing the robot to effectuate the trajectory of the non-real-time command according to the interpolated control parameter information.

Embodiment 2 is the method of embodiment 1, wherein computing the interpolated control parameter information comprises:
obtaining, by the real-time bridge, a previous value of the control parameter;
obtaining, by the real-time bridge, an updated value of the control parameter; and
generating a control parameter trajectory that assigns a value between the previous value and the updated value of the control parameter to each of multiple points in a time period.

Embodiment 3 is the method of embodiment 2, wherein the previous value of the control parameter is a current value of the control parameter.

Embodiment 4 is the method of embodiment 2, wherein the multiple points in the time period correspond to real-time control cycles of the robot.

Embodiment 5 is the method of any one of embodiments 1-4, wherein the control parameter is component stiffness that represents how easily a robot component is moved by an external stimulus.

Embodiment 6 is the method of embodiment 5, wherein the interpolated control parameter information transitions values of the component stiffness parameter from high stiffness to low stiffness over multiple periods of a real-time control cycle of the robot.

Embodiment 7 is the method of embodiment 5, wherein the component stiffness represents joint stiffness.

Embodiment 8 is the method of any one of embodiments 1-7, wherein the control parameter is a damping value.

Embodiment 9 is the method of any one of embodiments 1-8, wherein the control parameter is feedback gain.

Embodiment 10 is the method of any one of embodiments 1-9, wherein the control parameter is an interpolable control parameter.

Embodiment 11 is the method of any one of embodiments 1-10, wherein the real-time controller effectuates real-time control of the robot using a real-time sensor and real-time interpolated control parameter information.

Embodiment 12 is the method of embodiment 11, wherein the real-time interpolated control parameter information is computed using data from a non-real-time sensor.

Embodiment 13 is a system comprising: one or more computers and one or more storage devices storing instructions that are operable, when executed by the one or more computers, to cause the one or more computers to perform the method of any one of embodiments 1 to 12.

Embodiment 14 is a computer storage medium encoded with a computer program, the program comprising instructions that are operable, when executed by data processing apparatus, to cause the data processing apparatus to perform the method of any one of embodiments 1 to 12.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
receiving, by a robot interface subsystem, a command for a robot to perform a transition from performing a first task to performing a second task different than the first task;
computing, by the robot interface subsystem, trajectory information for controlling the robot to execute the transition from performing the first task to performing the second task;

computing, by the robot interface subsystem, interpolated control parameter information for the transition based on a first value of a control parameter assigned to the first task and a second value of a control parameter assigned to the second task, wherein the interpolated control parameter information is separate from the trajectory information and controls how the robot will react to external stimuli encountered by the robot when the robot performs the transition between the first task and the second task; and providing, by the robot interface subsystem, the trajectory information and the interpolated control parameter information to a real-time controller to effectuate the robot performing the transition according to the interpolated control parameter information.

2. The method of claim 1, wherein computing the interpolated control parameter information comprises:

obtaining, by the robot interface subsystem, a previous value of the control parameter;

obtaining, by the robot interface subsystem, an updated value of the control parameter; and generating a control parameter trajectory that assigns a value between the previous value and the updated value of the control parameter to each of multiple points in a time period.

3. The method of claim 2, wherein the previous value of the control parameter is a current value of the control parameter.

4. The method of claim 2, wherein the multiple points in the time period correspond to real-time control cycles of the robot.

5. The method of claim 1, wherein the control parameter is a component stiffness parameter that represents how easily a robot component of the robot is moved by an external stimulus encountered by the robot.

6. The method of claim 5, wherein the interpolated control parameter information comprises values of the component stiffness parameter that transition from high stiffness to low stiffness over multiple periods of a real-time control cycle of the robot.

7. The method of claim 5, wherein the component stiffness parameter represents joint stiffness.

8. The method of claim 1, wherein the control parameter is at least one of (i) a damping value, (ii) feedback gain, or (iii) an interpolable control parameter.

9. The method of claim 1, wherein the real-time controller effectuating the robot to perform the transition comprises:

computing, by the real-time controller and based on the trajectory information and the interpolated control parameter information, real-time commands for a low-level controller of the robot to effectuate the low-level controller based on the real-time commands.

10. The method of claim 2, wherein computing the interpolated control parameter information further comprises:

updating, by the robot interface subsystem, values of the interpolated control parameter information at a particular frequency.

11. The method of claim 1, wherein the real-time controller effectuates real-time control of the robot using a real-time sensor and real-time interpolated control parameter information.

12. The method of claim 11, wherein the real-time interpolated control parameter information is computed using data from a non-real-time sensor.

13. A system comprising:

one or more computers and one or more storage devices storing instructions that are operable, when executed by the one or more computers, to cause the one or more computers to perform operations comprising:

receiving, by a robot interface subsystem, a command for a robot to perform a transition from performing a first task to performing a second task different than the first task;

computing, by the robot interface subsystem, trajectory information for controlling the robot to execute the transition from performing the first task to performing the second task;

computing, by the robot interface subsystem, interpolated control parameter information for the transition based on a first value of a control parameter assigned to the first task and a second value of a control parameter assigned to the second task, wherein the interpolated control parameter information is separate from the trajectory information and controls how the robot will react to external stimuli encountered by the robot when the robot performs the transition between the first task and the second task; and providing, by the robot interface subsystem, the trajectory information and the interpolated control parameter information to a real-time controller to effectuate the robot performing the transition according to the interpolated control parameter information.

14. The system of claim 13, wherein computing the interpolated control parameter information comprises:

obtaining, by the robot interface subsystem, a previous value of the control parameter;

obtaining, by the robot interface subsystem, an updated value of the control parameter; and generating a control parameter trajectory that assigns a value between the previous value and the updated value of the control parameter to each of multiple points in a time period.

15. The system of claim 14, wherein the previous value of the control parameter is a current value of the control parameter.

16. The system of claim 14, wherein the multiple points in the time period correspond to real-time control cycles of the robot.

17. The system of claim 13, wherein the control parameter is a component stiffness parameter that represents how easily a robot component of the robot is moved by an external stimulus encountered by the robot.

18. The system of claim 17, wherein the interpolated control parameter information comprises values of the component stiffness parameter that transition from high stiffness to low stiffness over multiple periods of a real-time control cycle of the robot.

19. The system of claim 17, wherein the component stiffness parameter represents joint stiffness.

20. One or more non-transitory computer storage media encoded with computer program instructions that when executed by one or more computers cause the one or more computers to perform operations comprising:

receiving, by a robot interface subsystem, a command for a robot to perform a transition from performing a first task to performing a second task different than the first task;

computing, by the robot interface subsystem, trajectory information for controlling the robot to execute the transition from performing the first task to performing the second task;

computing, by the robot interface subsystem, interpolated control parameter information for the transition based on a first value of a control parameter assigned to the first task and a second value of a control parameter assigned to the second task, wherein the interpolated control parameter information is separate from the trajectory information and controls how the robot will react to external stimuli encountered by the robot when the robot performs the transition between the first task and the second task; and providing, by the robot interface subsystem, the trajectory information and the interpolated control parameter information to a real-time controller to effectuate the robot performing the transition according to the interpolated control parameter information.

* * * * *